US012682786B2

(12) United States Patent
Bregeard et al.

(10) Patent No.: US 12,682,786 B2
(45) Date of Patent: Jul. 14, 2026

(54) SYSTEM FOR ADVANCED PHYSICIAN TRAINING AND PATIENT SPECIFIC REHEARSALS

(71) Applicant: MENTICE AB, Gothenburg (SE)

(72) Inventors: Pierre Bregeard, Paris (FR); Pierre-Benoit Pirlot de Corbion, Paris (FR)

(73) Assignee: MENTICE AB, Gothenburg (SE)

( * ) Notice: Subject to any disclaimer, the term of this patent is extended or adjusted under 35 U.S.C. 154(b) by 465 days.

(21) Appl. No.: 18/260,207

(22) PCT Filed: Dec. 30, 2021

(86) PCT No.: PCT/IB2021/062498
§ 371 (c)(1),
(2) Date: Jun. 30, 2023

(87) PCT Pub. No.: WO2022/144838
PCT Pub. Date: Jul. 7, 2022

(65) Prior Publication Data
US 2024/0071253 A1      Feb. 29, 2024

Related U.S. Application Data

(60) Provisional application No. 63/131,951, filed on Dec. 30, 2020.

(51) Int. Cl.
*G09B 23/30*      (2006.01)
*G09B 23/28*      (2006.01)
*G09B 23/34*      (2006.01)

(52) U.S. Cl.
CPC ......... *G09B 23/285* (2013.01); *G09B 23/303* (2013.01); *G09B 23/34* (2013.01)

(58) Field of Classification Search
CPC ....... G09B 23/28; G09B 23/30; G09B 23/303
See application file for complete search history.

(56) References Cited

U.S. PATENT DOCUMENTS 6,062,866 A * 5/2000 Prom ..................... G09B 23/28
                                                             434/262
6,234,804 B1    5/2001 Yong
                    (Continued)

FOREIGN PATENT DOCUMENTS

EP          3279885 A1     2/2018
WO     WO-2020058760 A1 *  3/2020   ........... G09B 23/286

OTHER PUBLICATIONS

International Search Report and Written Opinion issued for International PCT Application No. PCT/IB2019/001029, filed on Sep. 20, 2019, on behalf of Biomodex S.A.S., Mail Date: Mar. 10, 2020, 8 pages.

(Continued)

*Primary Examiner* — Kurt Fernstrom
(74) *Attorney, Agent, or Firm* — Steinfl + Bruno LLP

(57)           ABSTRACT
A surgical training and rehearsal system, including at least one valve; at least one pump fluidically coupled with the at least one valve; a tank for storing a fluid fluidically coupled with the at least one valve; a heater in fluid communication with the tank configured to heat the fluid stored in the tank; at least one surgical approach tube having a proximal end sealingly covered by a self-healing elastomeric membrane, the surgical approach tube being fluidically coupled with the at least one valve, tank and pump; an exit port fluidically coupled with a distal end of the surgical approach tube; and an anatomical cartridge fluidically coupled with the exit port, the anatomical cartridge including at least one tortuous path whose shape, size and mechanical properties mimic those of a portion of a human circulatory system.

14 Claims, 18 Drawing Sheets

(56) References Cited

U.S. PATENT DOCUMENTS

| | | | | |
|---|---|---|---|---|
| 6,488,507 | B1 | 12/2002 | Stoloff et al. | |
| 8,608,484 | B2 * | 12/2013 | Kalafut | G09B 23/32 |
| | | | | 600/419 |
| 9,262,943 | B2 | 2/2016 | Clash | |
| 9,715,839 | B2 * | 7/2017 | Pybus | G09B 23/303 |
| 10,078,973 | B2 | 9/2018 | Barsness et al. | |
| 10,229,615 | B2 | 3/2019 | Carson et al. | |
| 11,682,320 | B2 * | 6/2023 | Sadasivan | G16H 50/20 |
| | | | | 434/268 |
| 12,062,296 | B2 * | 8/2024 | Pirlot de Corbion | |
| | | | | G09B 23/286 |
| 2005/0026125 | A1 | 2/2005 | Toly | |
| 2009/0162820 | A1 | 6/2009 | Tada et al. | |
| 2016/0027345 | A1 | 1/2016 | Carson et al. | |
| 2017/0076636 | A1 | 3/2017 | Moore et al. | |
| 2017/0103682 | A1 | 4/2017 | Okayama | |
| 2018/0018904 | A1 | 1/2018 | Okayama et al. | |
| 2018/0108276 | A1 | 4/2018 | Ishiyama et al. | |
| 2018/0158374 | A1 * | 6/2018 | Zamierowski | G09B 23/285 |
| 2018/0308394 | A1 | 10/2018 | Segall | |
| 2019/0204810 | A1 | 7/2019 | Radjou et al. | |
| 2019/0271967 | A1 | 9/2019 | Radjou et al. | |
| 2019/0272776 | A1 * | 9/2019 | Fiore | G09B 23/303 |
| 2019/0355280 | A1 | 11/2019 | Luciani | |
| 2019/0378436 | A1 * | 12/2019 | Krummenacher | G09B 23/30 |
| 2021/0350723 | A1 | 11/2021 | Pirlot et al. | |

OTHER PUBLICATIONS

International Search Report and Written Opinion issued for International PCT Application No. PCT/IB2021/062498 filed on Dec. 30, 2021 on behalf of Biomodex S.A.S. Mail Date: Mar. 21, 2022. 9 Pages.

Notice of Allowance issued for U.S. Appl. No. 17/278,049, filed Mar. 19, 2021 on behalf of Biomodex S.A.S. Mail Date: May 3, 2023. 9 Pages.

* cited by examiner

FEMORAL APPROACH (SIMPLIFIED)

RADIAL APPROACH 1

RADIAL APPROACH 2

FEMORAL APPROACH (AORTIC ARCH)

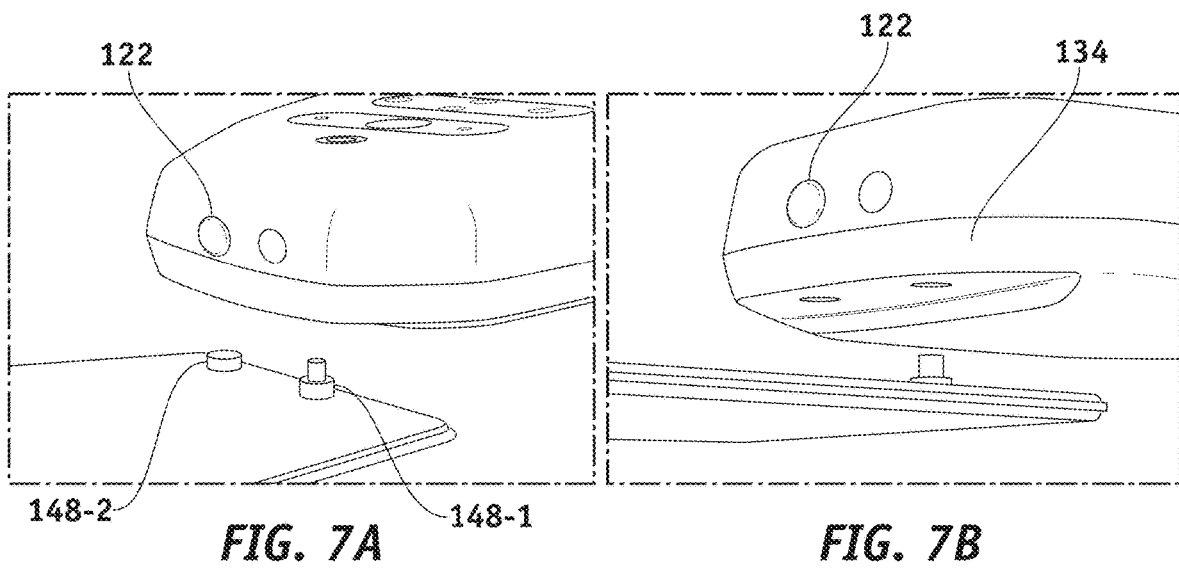
FIG. 7A　　　　　FIG. 7B
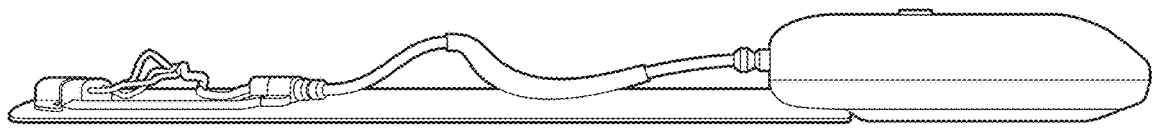
FIG. 7C
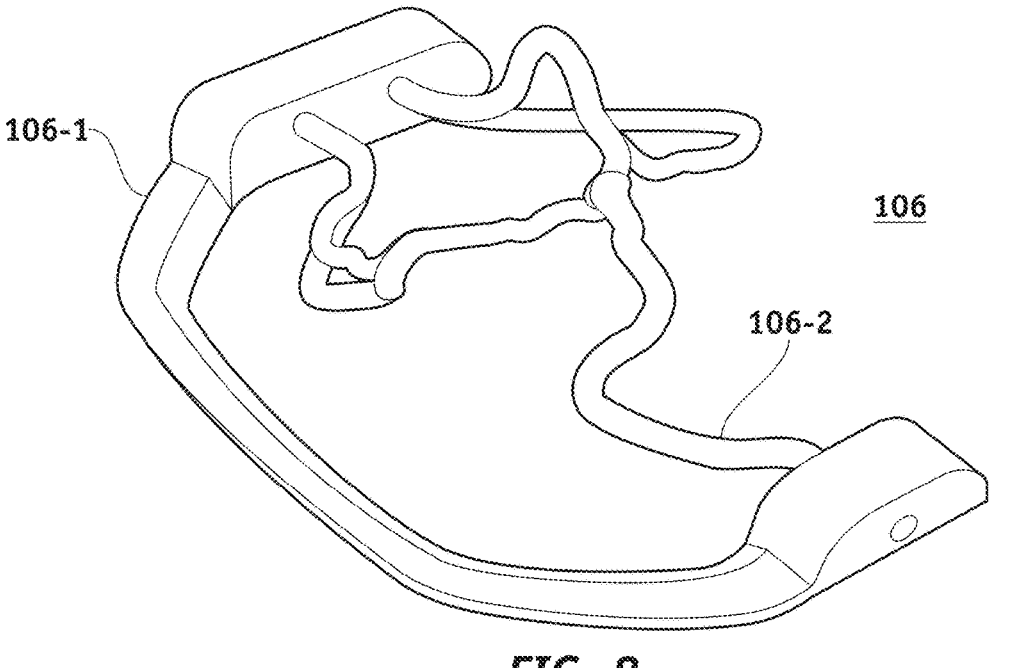
FIG. 8

Flow direction 1: Procedure

Flow direction 2: Flush cartridge

Flow direction 3: Flush

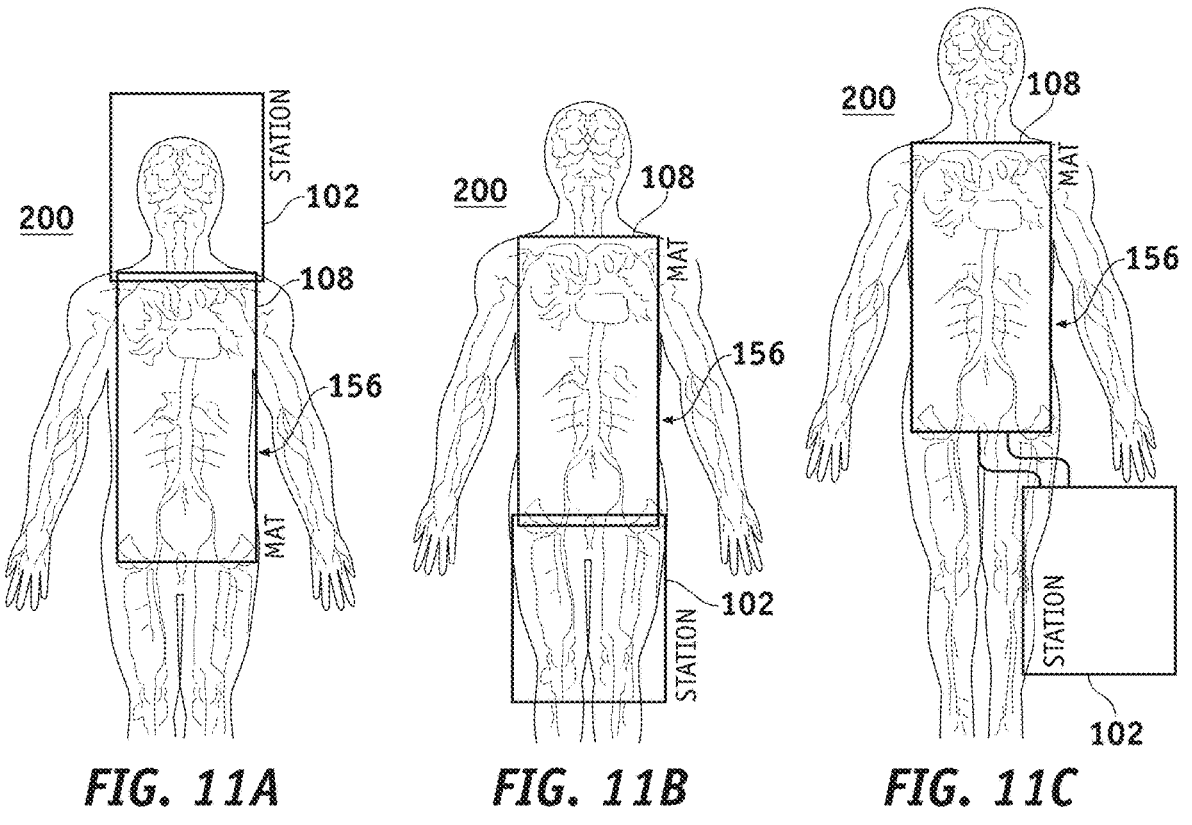
FIG. 11A   FIG. 11B   FIG. 11C

Patient specific

Standard

SYSTEM FOR ADVANCED PHYSICIAN TRAINING AND PATIENT SPECIFIC REHEARSALS

CROSS-REFERENCE TO RELATED APPLICATIONS

The present application is the US National Stage of International Patent Application No. PCT/IB2021/062498, filed on Dec. 30, 2021, which in turn, claims priority to U.S. Provisional Application No. 63/131,951, filed on Dec. 30, 2020.

This application claims priority to and benefit of U.S. Provisional Patent Application No. 63/131,951, filed Dec. 30, 2020. The following are hereby incorporated by reference in their entireties: U.S. application Ser. No. 16/333,872 filed 15 Mar. 2019; U.S. application Ser. No. 16/333,721 (PCT/IB2016/001500 filed 19 Sep. 2016, PCT publication WO2018051162) filed 15 Mar. 2019 entitled Method and Apparatus for Generating A 3D Model of An Object; U.S. application Ser. No. 16/333,872 (PCT/EP2017/073621 filed 19 Sep. 2017, PCT publication WO2018050915A1) filed Mar. 15, 2019 entitled Method for Fabricating A Physical Simulation Device, Simulation Device, Simulation System; and U.S. application Ser. No. 16/417,151 (PCT/IB2019/054160 filed 20 May 2019, PCT publication WO2019224700A1) filed 20 May 2019 entitled Echogenic Organ Replica and Method of Manufacture Using an Additive Manufacturing System.

BRIEF DESCRIPTION OF THE DRAWINGS

FIGS. 7A-7C show how the mat is removably coupled with the housing;

FIG. 8 is an enlarged view of an anatomical cartridge;

FIGS. 11A-11C show how the housing may be oriented relative to the mat to provide for various anatomical approaches;

DETAILED DESCRIPTION

Figure 1:
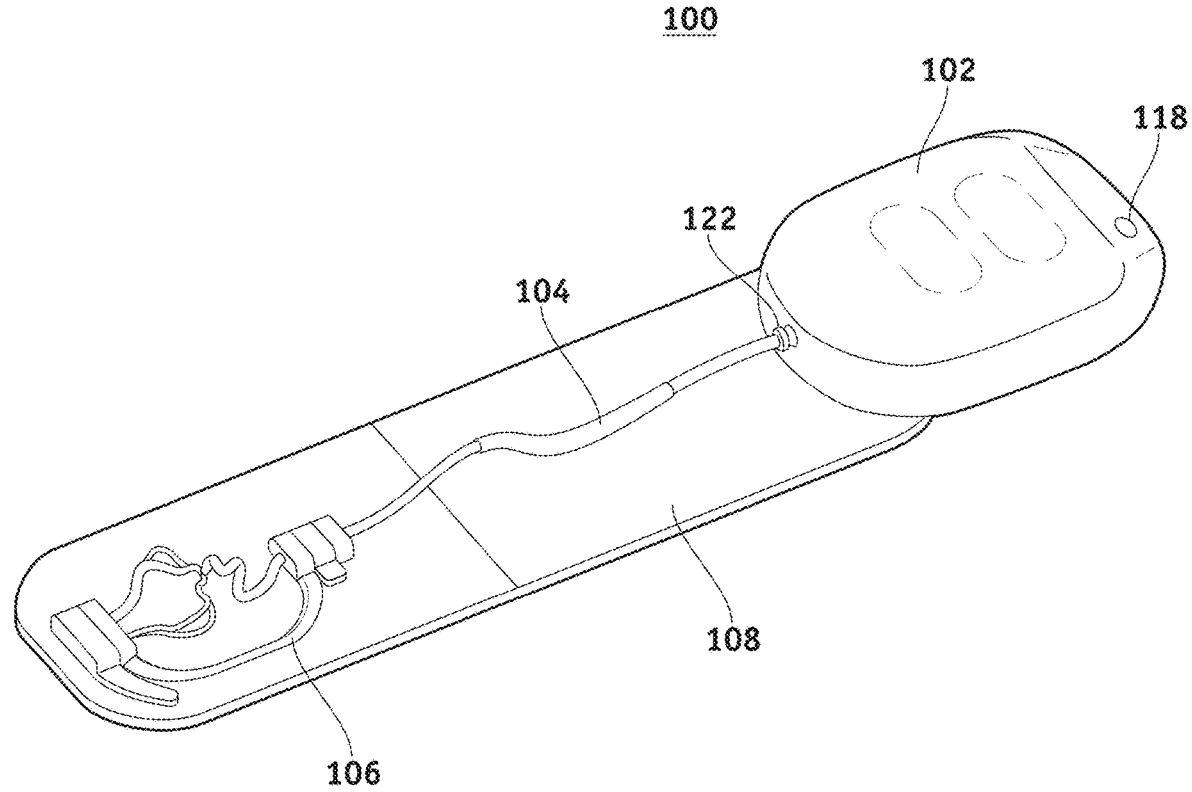
FIG. 1 shows an example system 100 including a housing, anatomical access cartridge, anatomical cartridge, and mat.

Disclosed is an innovative approach to advanced physician training and patient specific rehearsals. At least one embodiment of the System disclosed herein provides critical tactile feedback to physicians rehearsing a surgical procedure. At least one embodiment of the System is specifically adapted for use with 3D printed anatomical cartridges which reproduce the anatomy of at least a portion of anatomy. By manner of example, the 3D printed anatomical cartridges can include a 3D model of an intracranial aneurism. The 3D printed anatomical cartridges is formed of a combination of materials to provide desired mechanical behavior, X-ray compatibility, realistic fluoroscopic images See, U.S. application Ser. No. 16/333,872 filed 15 Mar. 2019, U.S. application Ser. No. 16/333,721 (PCT/IB2016/001500 filed 19 Sep. 2016, PCT publication WO2018051162) filed 15 Mar. 2019 entitled Method and Apparatus for Generating A 3D Model of An Object, U.S. application Ser. No. 16/333,872 (PCT/EP2017/073621 filed 19 Sep. 2017, PCT publication WO2018050915A1) filed Mar. 15, 2019 entitled Method for Fabricating A Physical Simulation Device, Simulation Device, Simulation System, and U.S. application Ser. No. 16/417,151 (PCT/IB2019/054160 filed 20 May 2019, PCT publication WO2019224700A1) filed 20 May 2019 entitled Echogenic Organ Replica and Method of Manufacture Using an Additive Manufacturing System.

The System is intended for use in a cathlab, and features a simulated systemic (circulatory) flow using a fluid replicating blood density and viscosity. In addition to the anatomical cartridges, the System includes anatomical access cartridges used to simulate an aortic arch, a radial approach (right or left hemisphere), and a femoral approach. The anatomical cartridges and the anatomic access cartridges may be generic, i.e., patient agnostic, or may mimic the unique anatomy of a patient (patient specific).

The generic anatomical cartridges and anatomic access cartridges may, for example, be used for training purposes, whereas the patient-specific cartridges, created from scans of the patient, may be used to rehearse a specific endoluminal procedure. Difficulties encountered using the patient-specific cartridges represent re-world challenges that the surgeon will encounter when performing the endoluminal procedure on the patient.

Separating the anatomical cartridge from the access cartridge enables a physician maximum flexibility to select the appropriate anatomy and the anatomical access. The anatomical cartridge and the anatomical access cartridge each utilizes a standard sized frame which enables plug-and-play replacement of cartridges.

The patient-specific cartridges are created from CT images, MRI images, and 3D angiography of a patient's unique anatomy.

In the context of an aneurism procedure, the System may be used to rehearse commonly used methods such as flow diversion, coil embolization, balloon-assisted coil embolization, stent placement, and intravascular device placement.

In the context of an ischemic procedure, the System may be used to rehearse clot removal by using commonly used methods such as thrombo-aspiration and stent retriever. The System is compatible with both natural and artificial clots. Natural clots are clots made from blood such as human, porcine or bovine blood, whereas artificial clots are made from substances other than blood. The station provides a solution to observe the amount of clot that embolizes distally during the ischemic procedure with the presence of a filter placed distally to the outflow of the cartridge. In some examples, the system includes a window such that the physician can view debris capture by the filter without interrupting the system.

In some examples, the clot is inserted directly into the anatomical cartridge using a needle or the like. In other examples, a clot cartridge 142 (FIG. 5E) which is a cartridge which has been pro-loaded with a clot is loaded into the System. In some examples, the clot cartridge 142 is interposed between the anatomical cartridge and the anatomical access cartridge. The clot cartridge 142 provides plug-and-play functionality, allowing the physician to add additional clots on the fly. In still further examples, the System 100 is equipped with a port covered by a self-healing membrane through which clots may be inserted on-the-fly, i.e., without disrupting the flow of fluid.

FIG. 1 shows an example system 100 including a housing 102, anatomical access cartridge 104, anatomical cartridge 106, and mat 108.

In some examples, one or more of the anatomical cartridge 106 and the anatomical access cartridge 104 may be provided with one or more connection mechanisms (e.g., a magnet and/or ferromagnetic material with another magnet and/or ferromagnetic material being provided in the mat 108 or a snap mechanism configured in the mat 108 and one or more of the anatomical access cartridge 104 or anatomical cartridge 106) such that the anatomical cartridge 106 and/or anatomical access cartridge 104 snaps into a desired orientation and resists inadvertent mis-orientation relative to the mat 108. One or more connection mechanisms may be provided in a base of the anatomical cartridge 106, anatomical access cartridge 104 and/or on proximal and/or distal ends of the anatomical cartridge 106, anatomical access cartridge 104. One or more connection mechanisms may be provided in the mat 108 proximal a corresponding location in the anatomical cartridge 106, anatomical access cartridge 104.

Figure 2:
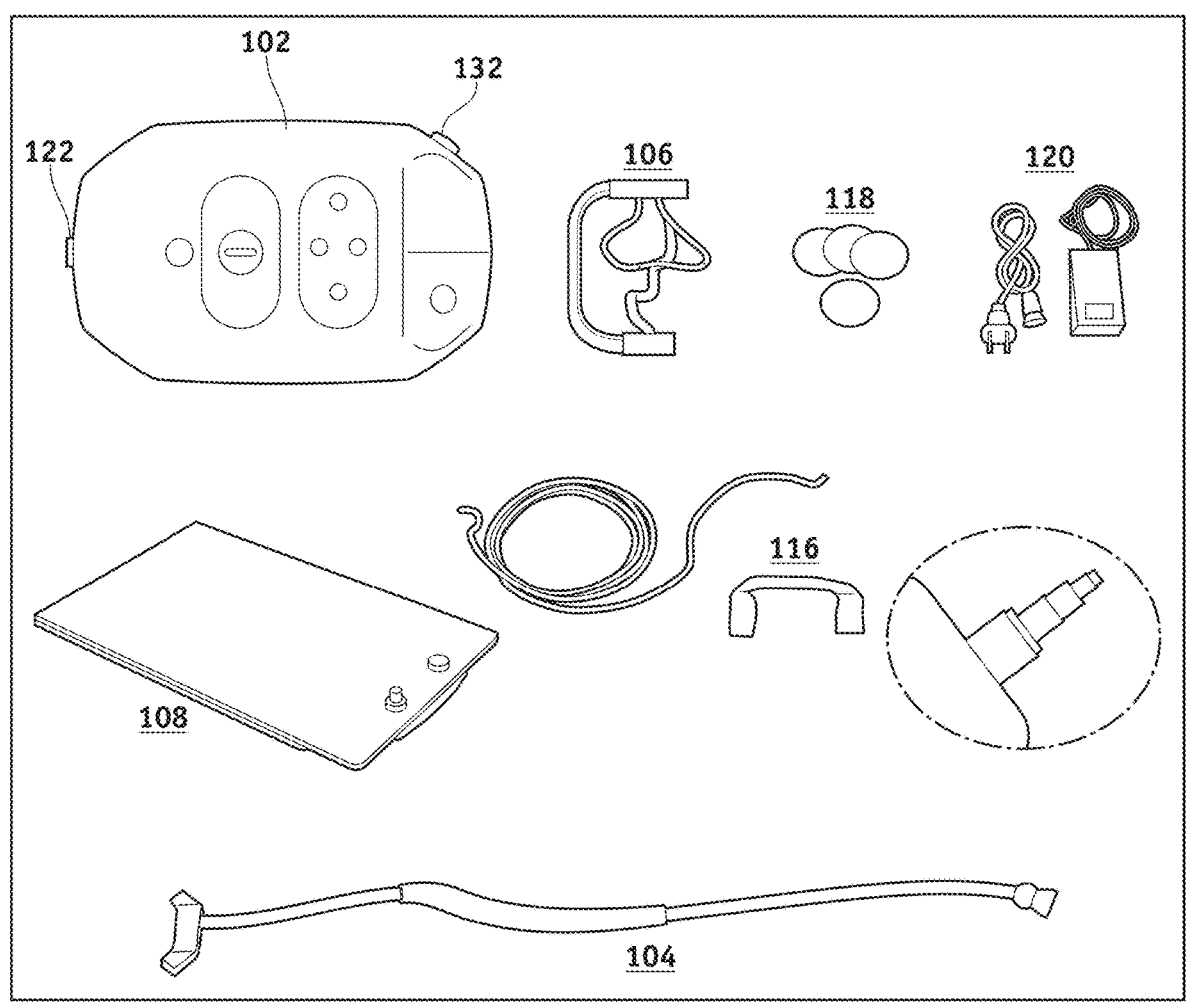
FIG. 2 is a component level view of the system of FIG. 1.
Figure 3A:
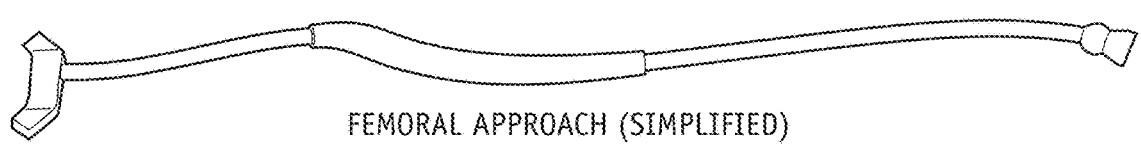
FIGS. 3A-3D show examples of anatomical access cartridges.
Figure 3B:
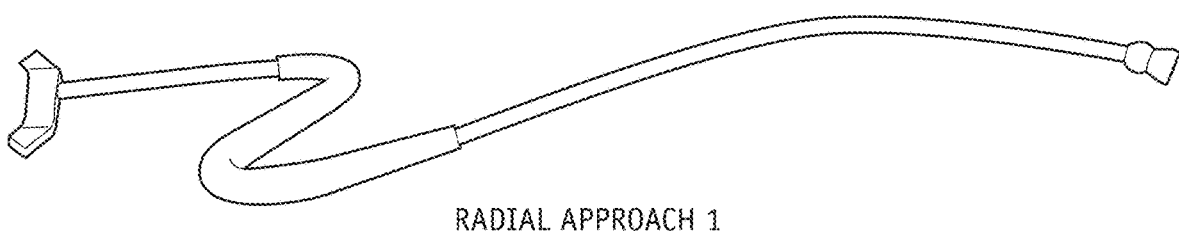
Figure 3C:
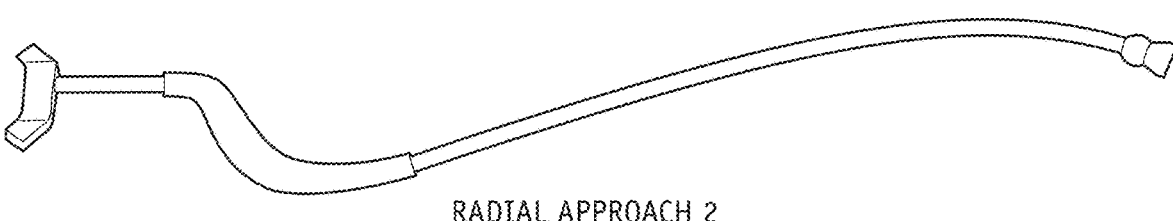
Figure 3D:
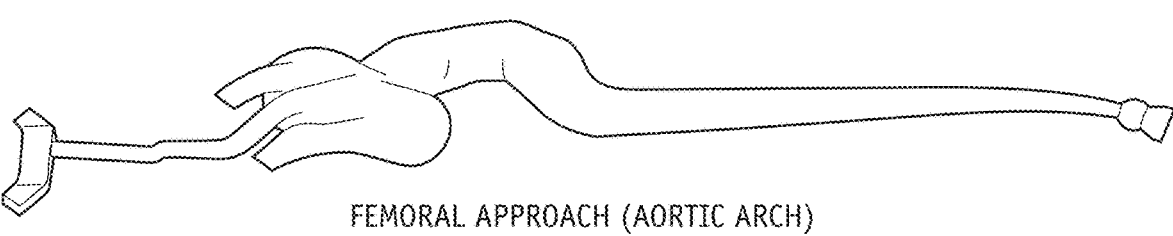

FIG. 2 is a component level view of the system of FIG. 1 and depicts the housing 102, cartridge 106, mat 108, flush tube and bag 116, membrane 118, and power supply 120.

FIG. 3 shows various example anatomical access accessories 104 for simulating a radial approach (right or left hemisphere), and a femoral approach. The depictions are purely examples and are not intended to be limiting. As shown in FIG. 1, the anatomical access accessory 104 is interposed between and fluidically connects an outflow port 122 on the housing with the anatomical cartridge 106.

The external appearance of the anatomical access accessory 104 as well as the anatomical cartridge 106 may or may not mimic the appearance of similar organs on the human body. The anatomical access accessory 104 and the anatomical cartridge 106 are both hollow three-dimensional structures having a lumen whose size, geometry, internal resistance and mechanical characteristics match those of corresponding organs in the human body. This is because the system 100 is intended to provide the same tortuous path, mechanical characteristics, and resistance as encountered by the physician during endoluminal navigation. In the case of a patient-specific anatomical cartridge 106 and/or patient-specific anatomical access cartridge 104 the interior geometry will precisely mimic the interior geometry of corresponding organs of the patient. The materials used to print the anatomical access accessory 104 and the anatomical cartridge 106 mimic the mechanical properties of tissue and provide very realistic feedback to the physician.

The system of the present is compatible with X-ray to allow real time navigation with fluoroscopy. The system of the present invention mimics the real-world experience that the surgeon will encounter. More particularly, the system uses materials selected to avoid providing unrealistically good contrast and without artifacts that the surgeon would not expect to encounter during the actual endoluminal procedure. More particularly, the mat, anatomical access cartridge, anatomical cartridge, and return tube are all constructed of X-ray compatible materials. More particularly, the materials utilized have low-X-ray absorption. By manner of illustration, the System may utilize polymeric materials. The anatomical cartridge and the anatomical access cartridge utilize materials which provide the same or similar contrast (visualization experience) as the native anatomical organs. In contrast, the System is constructed to minimize X-ray artifacts and the like which the user would not experience in the actual endoluminal procedure. The system is compatible with contrast agent such as iodine used to highlight the lumen during navigation.

The solution described aims to simulate unruptured aneurysm embolization and ischemic stroke procedures in real clinical conditions meaning:

Realistic dimensions, mechanics, and tortuosity of the
    artery

Realistic physiological environment: temperature, flow,
    pressure, viscosity

Usage of fluoroscopy for navigating inside the patient

The complexity of the simulated procedure uses the anatomical topology of the patient case.

One or more embodiments of the System presents the user with the same or similar visualization experience as surgery and hence does not facilitate direct viewing using transparent arteries or transparent organs.

Figure 4A:
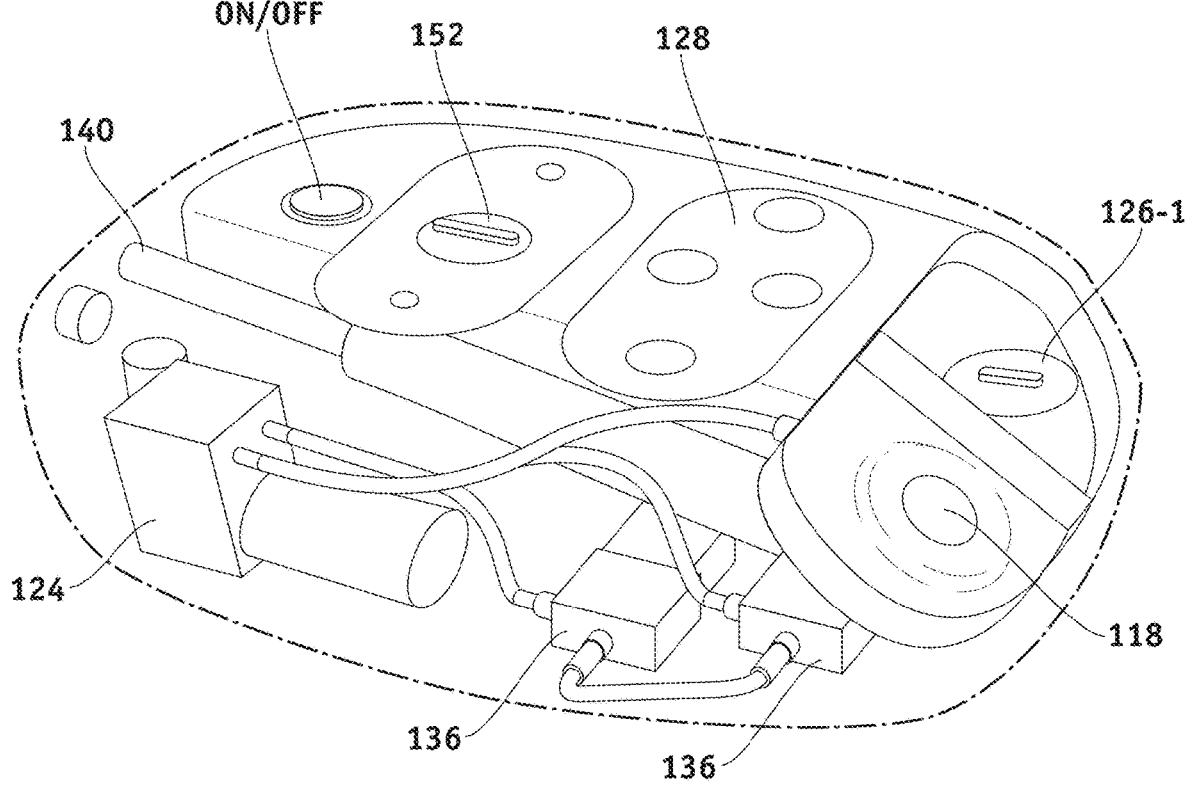
FIGS. 4A-4C are views of the housing and components thereof.
Figure 4B:
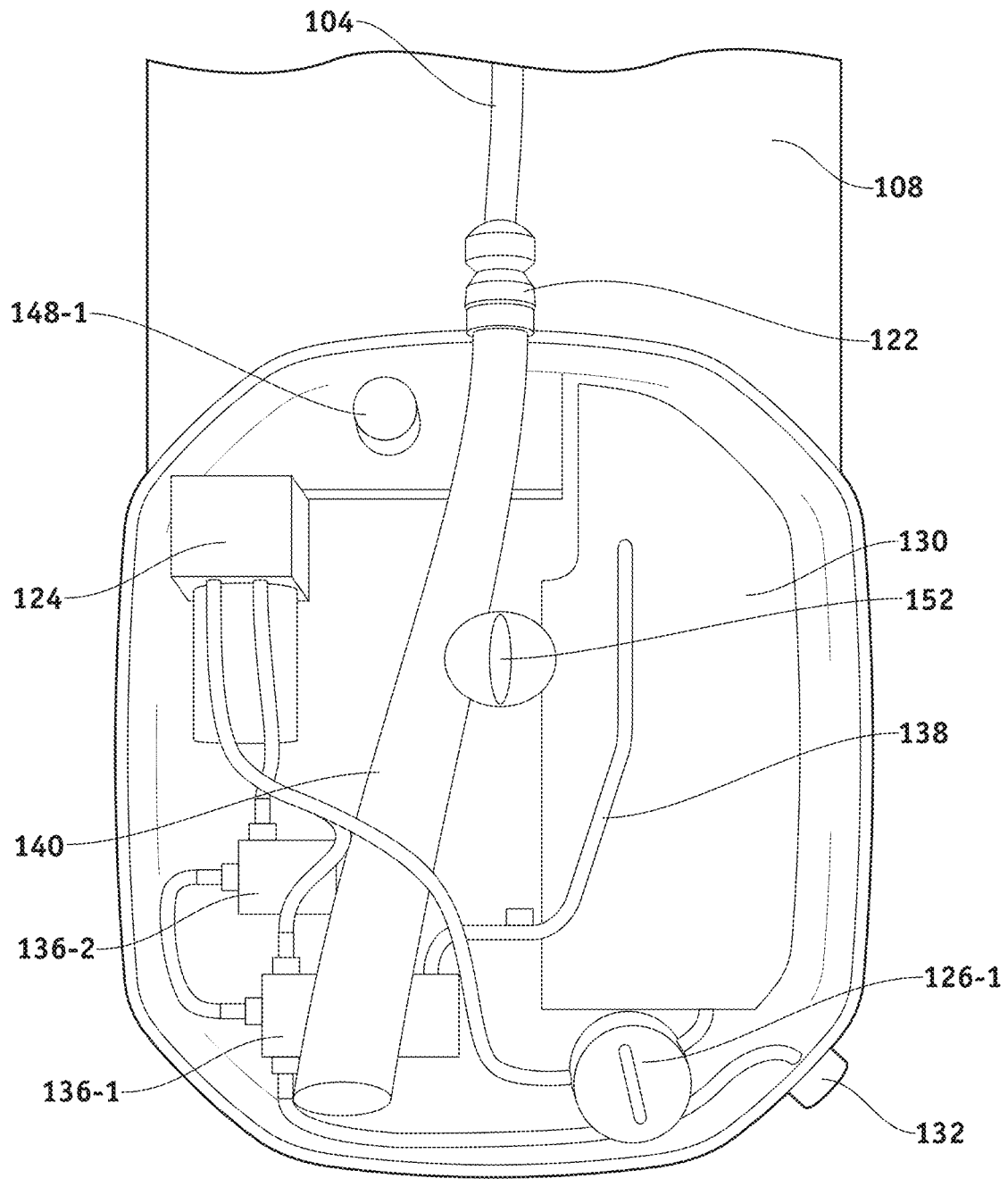

FIGS. 4A-4B show an interior of an example housing 102. The housing 102 contains a membrane 118, a pump 124, a primary filter 126-1, an electronics assembly 128, a tank 130, a drain port 132, solenoid valves 136-1, 136-2, heater 138, approach 140 and fill port 144.

As best seen in FIG. 4A, the membrane 118 is a self-healing elastomeric member which covers a proximal end of the approach 140. The membrane 118 provides the surgeon with an access point for accessing the approach 140 with surgical tools and implants used in the endoluminal procedure and is intended to mimic the resistance of accessing a human blood vessel with a surgical tool. The approach 140 extends the length of the housing 102, and is fluidically coupled with the outflow port 122 (FIG. 1), anatomical access cartridge 104 and the anatomical cartridge 106.

Figure 5A:
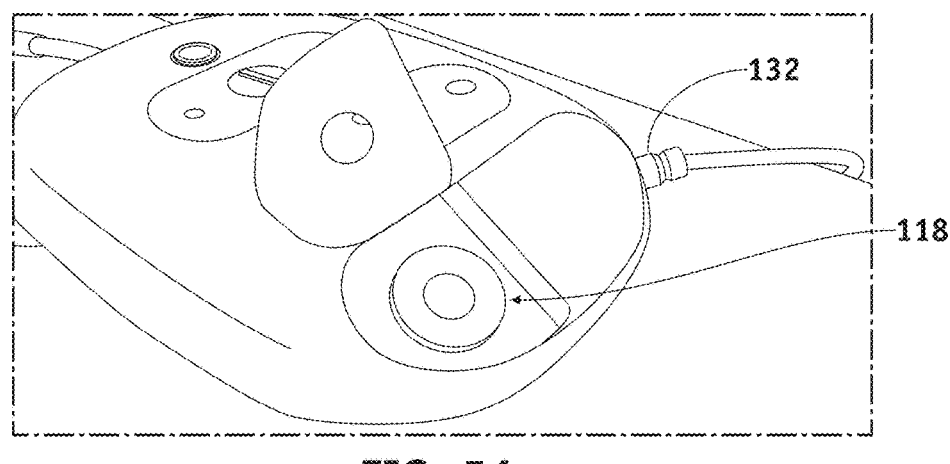
FIGS. 5A-5B show the access for the surgical approach and filter.

The membrane 118 is replaceable. As best seen in FIG. 5A, a hatch 118C provides access to replace the membrane 118. Hatch 118C includes an access port through which the physician accesses the membrane 118 with surgical tools.

Fill port 144 (FIG. 4B) is fluidically coupled with the tank 130 and is used to fill the tank 130.

Drain Port 132 is used to drain fluid from the tank 130. In use, the flush bag and tube 116 (FIG. 2) is fluidically coupled with the drain port to collect fluid discharged from the tank.

The system 100 may include a heater 138 (optional) provided in the tank 130 to maintain the fluid at a desired temperature, e.g., 100 degrees Fahrenheit (37 Celsius). The electronics assembly 128 supplies power to and controls the operation of the heater 138, pump 124, and solenoid valves 136-1, 136-2. In some examples, the electronics assembly 128 is used to adjust the flow rate of the pump 124.

Figure 4C:
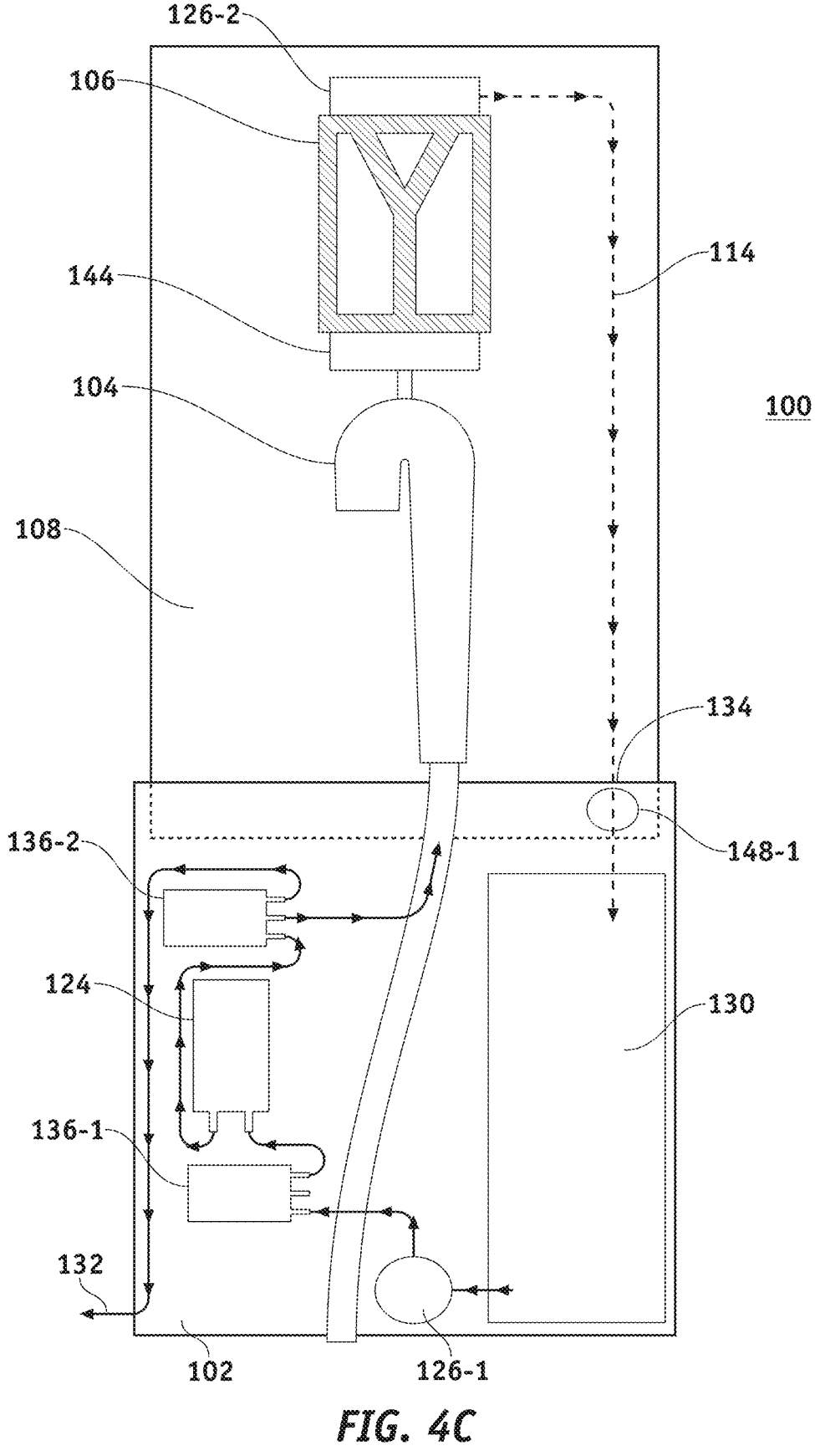

FIG. 4C is a functional block diagram of the system 100 which shows one example of how pump 124 may be connected to the solenoid valves 136-1, 136-2. FIG. 4C further illustrates an example of how the fluid from the tank 130 is passed through filter 126-1, solenoid valve 136-1, pump 124, solenoid valve 136-2 and into the femoral approach 140 prior to exiting the housing 102.

Figure 5B:
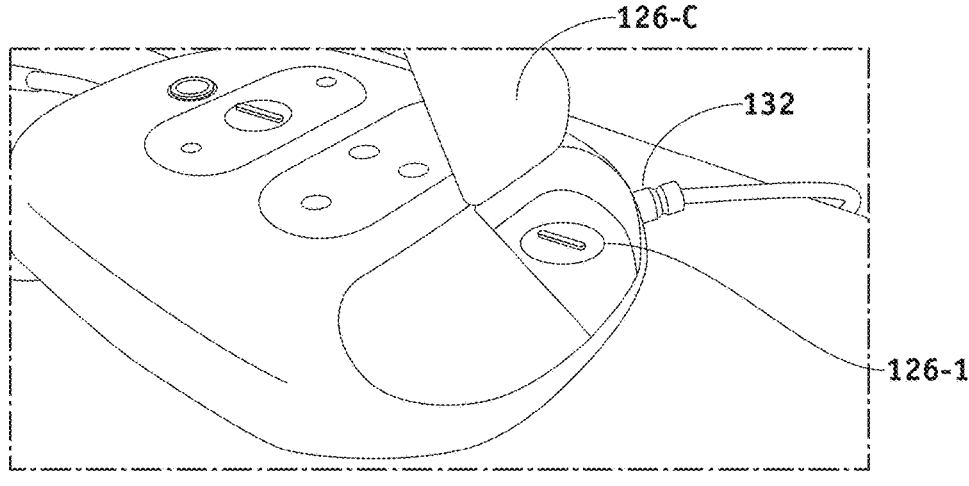

FIG. 5B shows hatch 126C used to access the filter 126-1 which filters the fluid before it enters solenoid valve 136-1.

In the direction of fluid flow, the fluid exits the housing 102 via port 122 and enters the anatomical access cartridge 104 which in the example depicted in FIG. 4C is an aortic arch.

Figure 5C:
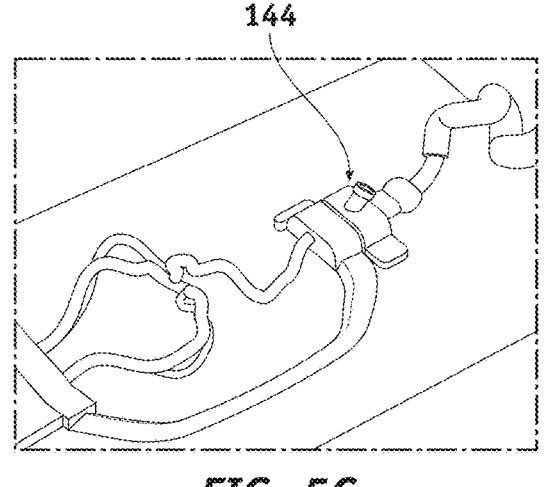
FIGS. 5C-5D show the clot insertion port.
Figure 5D:
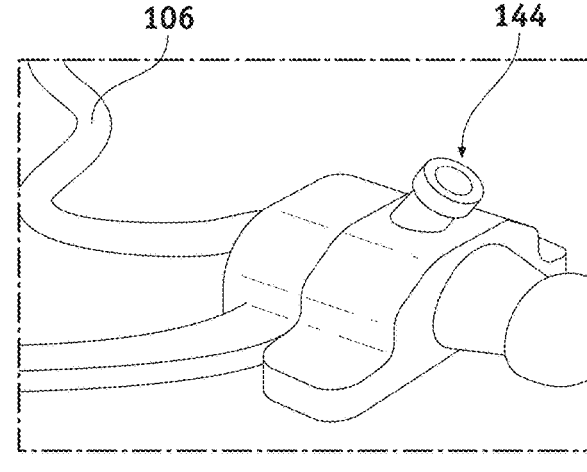

Turing once again to FIG. 4C, one or more embodiments of System 100 features a clot insertion area which may for example be provided between the anatomical access cartridge 104 and the anatomical cartridge 106. FIGS. 5C and 5D illustrate a clot insertion port 144 through which a clot may be inserted using a syringe or the like. The clot insertion port 144 is fluidically coupled to and upstream from the anatomical cartridge 106 such that clots inserted into the port 144 will lodge in the anatomical cartridge 106. The clot insertion port 144 features a self-healing membrane to prevent the leakage of fluid during and after the port 144 is accessed by a syringe to insert the clot.

Figure 5E:
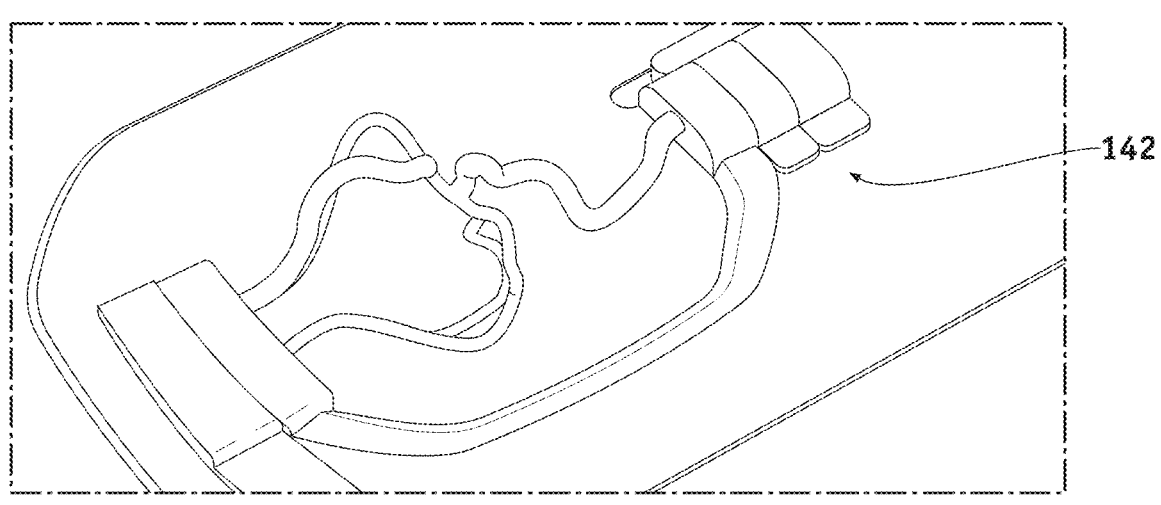
FIGS. 5E-5G show the clot cartridge and clot cartridge locking mechanism.
Figure 5F:
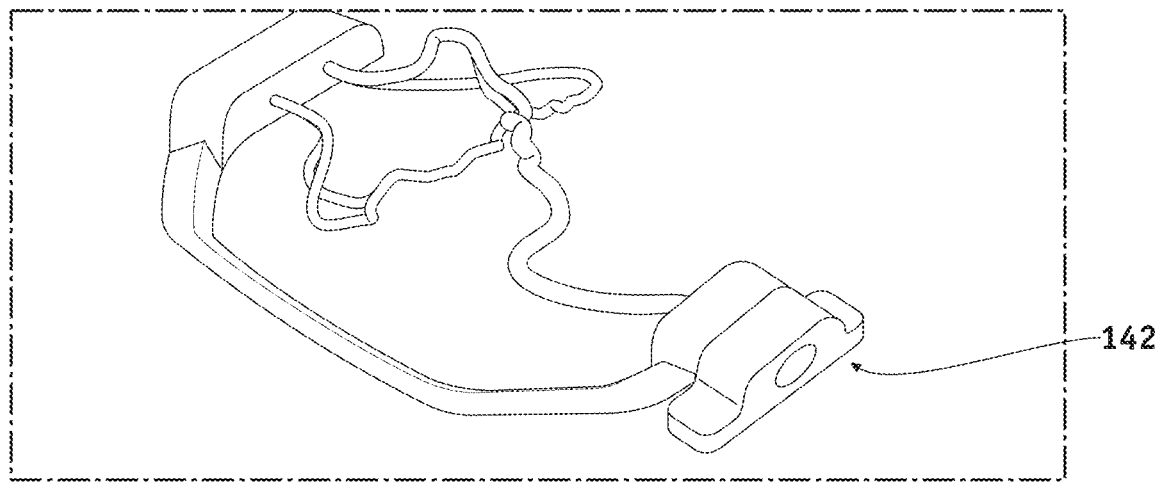
Figure 5G:
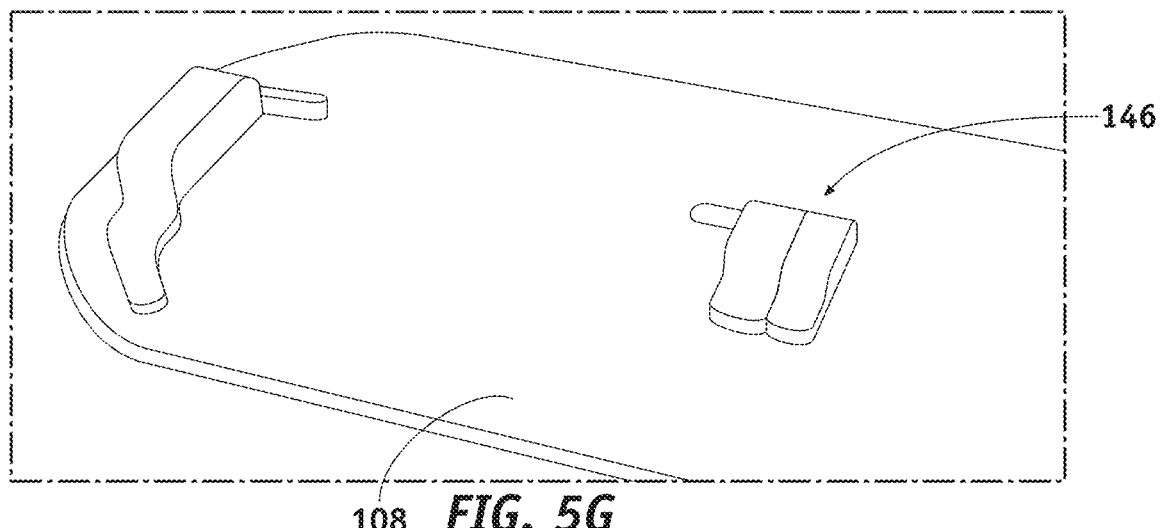

FIGS. 5E through 5G depict the use of a clot cartridge 142 which is a cartridge which has been pre-loaded with a clot. As best seen in FIGS. 5E and 5F, the clot cartridge 142 is operatively coupled to the anatomical cartridge 106. FIG. 5G illustrates an adjustable locking feature 146 which slidably adjusts between first, second and third positions. In the first position, the adjustable locking feature 146 is fully extended to allow insertion/removal of the anatomical cartridge 106 alone and/or the anatomical cartridge 106 combined with the clot cartridge 142. In the second position, the adjustable locking feature 146 engages with and locks the anatomical cartridge 106 and the clot cartridge 142 in place to prevent leaks. In the third position, the adjustable locking feature 146 engages with and locks the anatomical cartridge 106 (without the clot cartridge 142) in place to prevent leaks.

As depicted in FIG. 4C, the system 100 may include an optional secondary filter 126-2 external to the housing and in-line with the return path of fluid exiting the anatomical cartridge 106. The purpose of providing secondary filter 126-2 is to enable the physician to quickly and easily visualize any clot debris generated during clot removal process. In some examples, the system 100 includes a transparent window such that the physician can view debris captured by the filter without interrupting the system. In some examples, the transparent window includes a magnifying lens to enlarge any debris captured by the filter.

Figure 6:
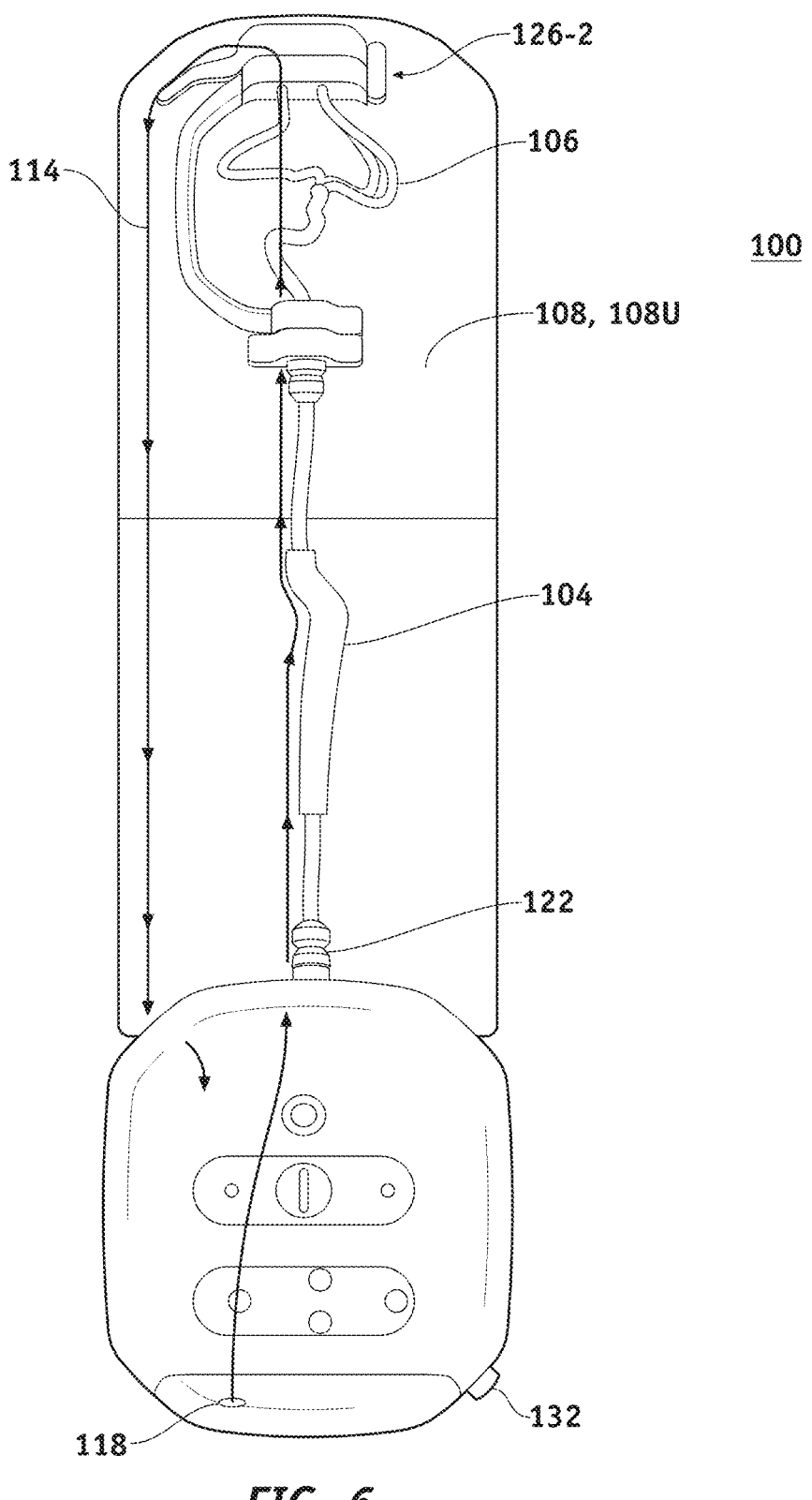
FIG. 6 shows the direction of circulation in the system and the return line.

FIG. 6 shows the circulatory flow of fluid through the system 100. Return tube 114 (shown in dashed lines) may be embedded or housed within the mat 108 or may be provided on either an upper surface 108U of the mat 108 which is visible to the user or lower surface of the mat which is not visible to the user. Return tube 114 terminates with coupler 108-1 (FIG. 2) which is removably coupled with inflow port 134 (FIG. 4C) which in turn is fluidically coupled with the tank 130. In some examples, the inflow port 134 is located on the underside of the housing 102 such that when the housing 102 is placed on the mat 108, the inflow port 134 engages coupler 108-1 (FIG. 2) which is fluidically coupled the return tube 114.

In the examples depicted in FIGS. 4A-4C, two solenoid valves are used to control circulation of the fluid and/or drain the fluid. One of ordinary skill in the art will appreciate that a single solenoid valve may be used or that the solenoid valve(s) may be replaced with one or more mechanically actuated valves.

Power supply 120 (FIG. 2) is removably attached to the housing 102 and supply power to the electronics assembly 128.

A flush tube and bag 116 (FIG. 2) removably connect to drain port 132. In operation, the system 100 may be flushed by attaching the flush tube and bag 116 to the drain port 132 (FIG. 5B), and then manually or electronically setting the valve 136 into the first position, and actuating the pump 124.

FIGS. 7A-C show another example of how the inflow port 134 may be coupled with the return tube 114. In FIGS. 7A-7B, the housing is equipped with two studs 148-1, 148-2 which mattingly engage with corresponding recesses 150-1, 150-2 in mat 108. One of the studs 148-1, 148-2 and a corresponding one of the recesses 150-1, 150-2 are fluidically coupled with the return line 114, the other one of the studs 148-1, 148-2 and a corresponding one of the recesses 150-1, 150-2 are provided to avoid rotation of the station 102 relative to the mat 108.

FIG. 8 is an enlarged view of an anatomical cartridge 106. The anatomical cartridge includes a frame 106-1 which does not form part of the anatomy and whose purpose is merely to support the anatomical portion 106-2 and keep it in the anatomical orientation. The anatomical portion 106-2 includes at least one tortuous path having a lumen whose shape, size and mechanical properties mimic those of a human blood vessel selected from the group subclavian artery, common carotid artery, and cerebral artery.

Endovascular System

FIGS. 11A-11C depict system 200 which is a variation on system 100 and includes a station 100 and a mat 108. Like components will use like numbers. System 200 is intended to simulate endovascular procedures through the aorta such as, but not limited to, abdominal aortic aneurysm, thoracic aortic aneurysm, aortic arch aneurysm, and iliac aneurysm. One of the features of both system 100 and system 200 is its compatibility with radio-imaging and C-arm.

FIGS. 11A-11C show different ways of orientating the station 102 relative to the anatomy to enable users to interact with the station 102 using the same anatomical approach they would use with a patient. FIG. 11A shows the station 102 oriented at the patient's head. FIG. 11B shows the station 102 oriented at the patient's legs. FIG. 11C is a minor variation on FIG. 11B showing the station 102 interconnected to the mat 108 by tubing 108-T.

System 200 includes a station 102 (FIGS. 11A, 11B), an anatomical cartridge 106, a mat 108, and optionally a spine 156. The system 200 may optionally include an anatomical access accessory 104. In some examples, the spine 156 is a three-dimensional representation of a spine mounted on the mat 108 whose exterior surface mimics the surface geometry of a human spine, and the anatomical cartridge 106 is placed on top of the spine 156. The spine 156 is formed of radiopaque materials which provide realistic visual landmarks using the imaging modalities commonly used in the cath lab, e.g., radio-imaging and C-arm. In some examples, spine 156 is a hollow vertebra for which the thickness varies to modulate the x-ray absorption depending on the material used. In some examples, the anatomical cartridge 106 is removably fixed to the spine 156. In some examples, the anatomical cartridge 106 removably fixed to the mat 108.

In some examples, the spine 156 is one or more two-dimensional layers or coatings of radiopaque material or radiopaque ink viewable using radio-imaging and C-arm which are provided (e.g., painted or printed) on or within the mat 108 to provide the appropriate image representation of anatomical landmarks. In some examples, the aforementioned two-dimensional spine 156 provides a simulated three-dimensional image when viewed using radio-imaging and C-arm. In some examples, a spinal shadow card can be provided in mat 108 to generate, under x-ray imaging, a spinal shadow. The shadow of the spine is used during the procedure by the clinician to estimate the location of the catheter within the anatomy. By knowing the location of the catheter in relation to the vertebra, the surgeon is able to understand the location of the catheter in the vasculature, i.e., whether they are in front of the septum to initiate a transseptal puncture, for example.

The spinal shadow card may include a substrate and a spinal simulation feature formed on the substrate. Spinal simulation feature may be printed on, embedded within, etched in, or otherwise formed on or in substrate. For example, spinal simulation feature may be a radio opaque ink printed on an x-ray transparent substrate. Spinal simulation feature may be patient-specific or may represent the geometrical shape of a shadow of a generic patient (e.g., to a C-ARM fluoroscopy instrument at least at 0 degrees during the catheter navigation in the right atrium).

Other accessories may be added and/or the anatomical cartridge may be modified to simulate a radial approach, and to simulate external portions of the anatomy with which the surgeon typically interacts during the procedure. By manner of example, during the endovascular procedure the surgeon may typically rest their hands on the patient's upper thigh for support. Thus, the exterior surface of the station 102 may be shaped to replicate a surface geometry of a portion of the patient's upper thigh to provide the surgeon with a realistic place to rest or support their hands. In the preceding example, the exterior surface of the station 102 may be formed of a material mimicking the feel of a human thigh to provide the surgeon with a more accurate interventional experience. These and other features will be explained in detail below with reference to the drawings.

Figure 12A:
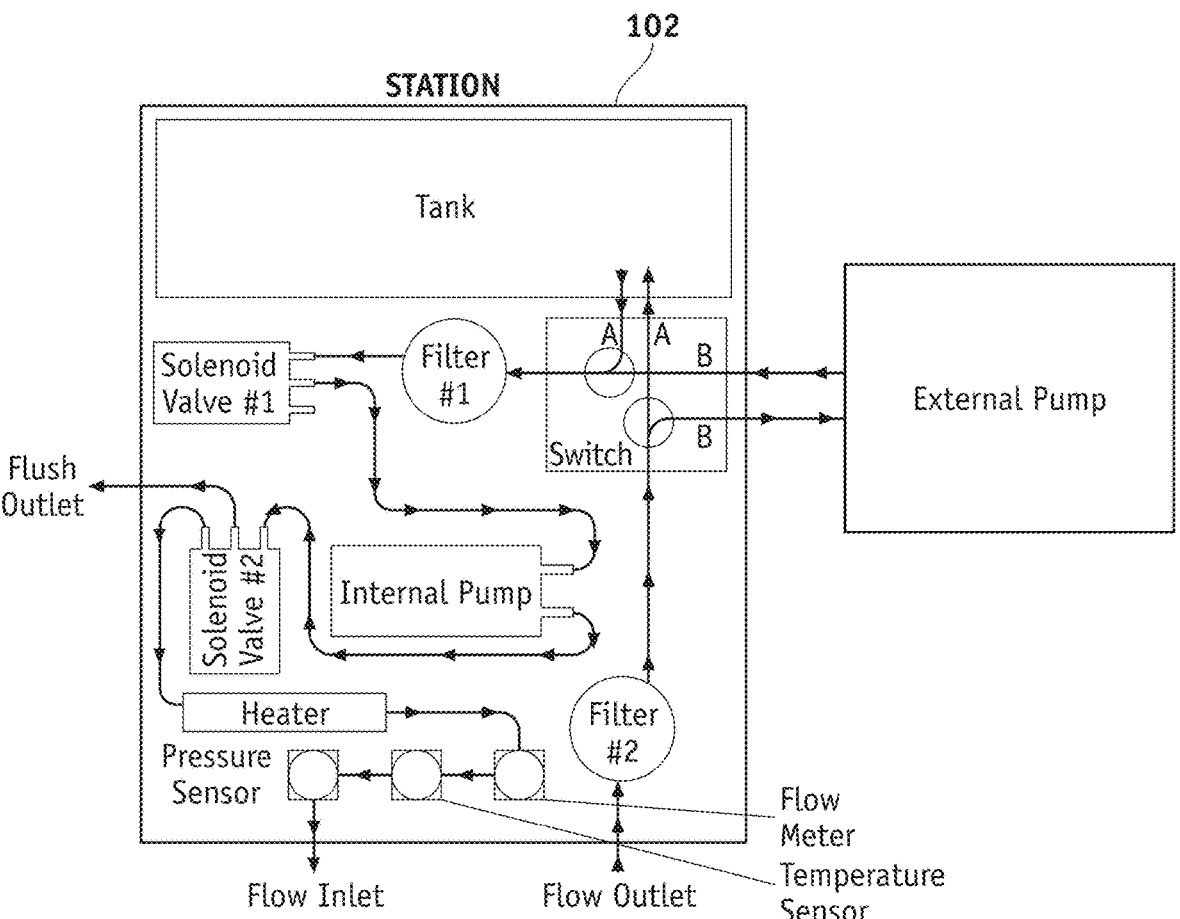
FIGS. 12A-12B show variations on pump placement in the housing.
Figure 12B:
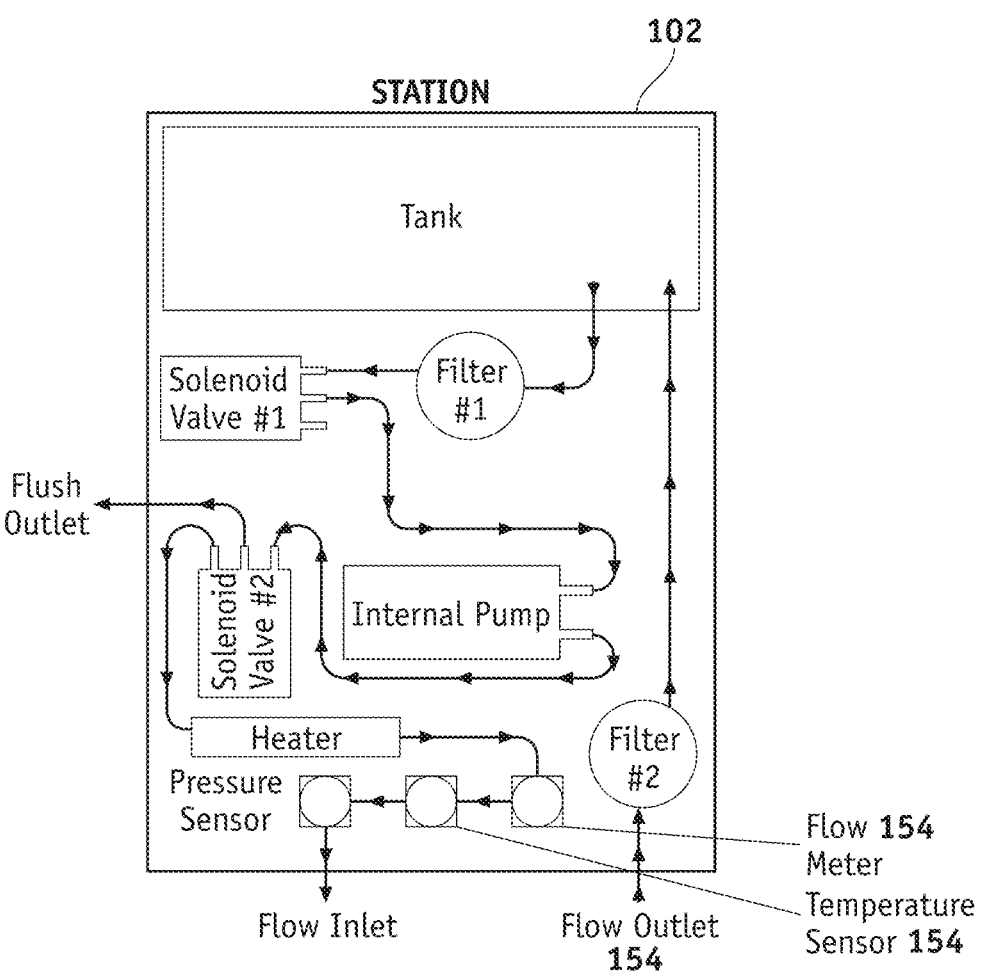

As best seen in FIGS. 12A and 12B system 200 includes a pump 124 to circulate a blood mimicking fluid. The arrows in FIGS. 12A-13B show the direction of flow of the blood mimicking fluid. The conduit or tubing 108-T through which the blood mimicking fluid circulates through the system 200 has been omitted for clarity. In operation, conduit or tubing 180-T is used to communicate fluid along the path indicated by the arrows.

The fluid flow provided by the pump 124 may be continuous or pulsatile. In some examples, the user may optionally toggle the pump 124 between continuous or pulsatile flow. In other examples, the pump 124 only provides continuous flow or only provides pulsatile flow.

Station 102 may contain one or more filters 126 to protect the solenoid valve 136 and the pump 124. The filter 126 may be located within the tank 130 and/or may be external to the tank 130, e.g., in fluid connection with the solenoid valve 136 and the pump 124. In some examples, two or more filters 126 are provided.

FIGS. 12A and 12B show an example with filter 126-1 in fluid connection (communication) with solenoid valve 136-1, and filter 126-1 in fluid communication (connection) with the inlet of the tank 130.

The pump 124 in System 100 and system 200 may be located within the housing 102 (e.g., FIGS. 4A, 12B), or the pump may be external to the housing 102 (e.g., FIG. 12A). The choice to house the pump 124 within or external to the housing 102 is purely for convenience and does not impact the function or operation of the system.

System 100 and System 200 may optionally include one or more sensors 154 for measuring a variety of parameters including the temperature of the blood mimicking fluid, the pressure of the blood mimicking fluid, and flow rate of the blood mimicking fluid. In some examples, a sensor 154 may be capable of measuring multiple parameters. For example, a single sensor 154 may be capable of measuring both fluid flow and fluid pressure. Sensors 154 may be added to various points of the anatomy 106 to provide a better understanding of how flow and/or pressure may fluctuate during the endovascular procedure. In some examples, the user may move or reposition the sensors 154 to various parts of the anatomy 106 to gain an understanding of how the flow rate or pressure fluctuates in a specific portion of the anatomical cartridge during the simulated endovascular procedure. The examples depicted in FIGS. 12A and 12B show three sensors 154; however, the system 100/200 may include any number of sensors.

In some examples the output of the temperature sensor 154 may be used to provide feedback for controlling the heater 138 to ensure that the blood mimicking fluid stays within the desired temperature range.

In some examples the user may adjust the flow rate and/or pressure provided by the pump 124. A flow sensor 154 allows the monitoring of the flow rate.

One or more displays (hardware) may be provided to display the readings from the one or more sensor(s) 154. The station 102 may be provided with the capability of transmitting the sensor data to an external device or display. For example, the station may be provided with an antenna for wirelessly communicating data using the Bluetooth communications protocol to a device which captures and/or displays the data.

The system 200 includes a tank 130 to store the fluid that will circulate through the anatomical cartridge 106. The tank 130 can be flushed out by the pump 124 through flush outlet using a solenoid valve 136 that modifies temporarily the fluid path. E.g., FIGS. 10A-10C.

The Anatomy

Figures 13A, 13B:
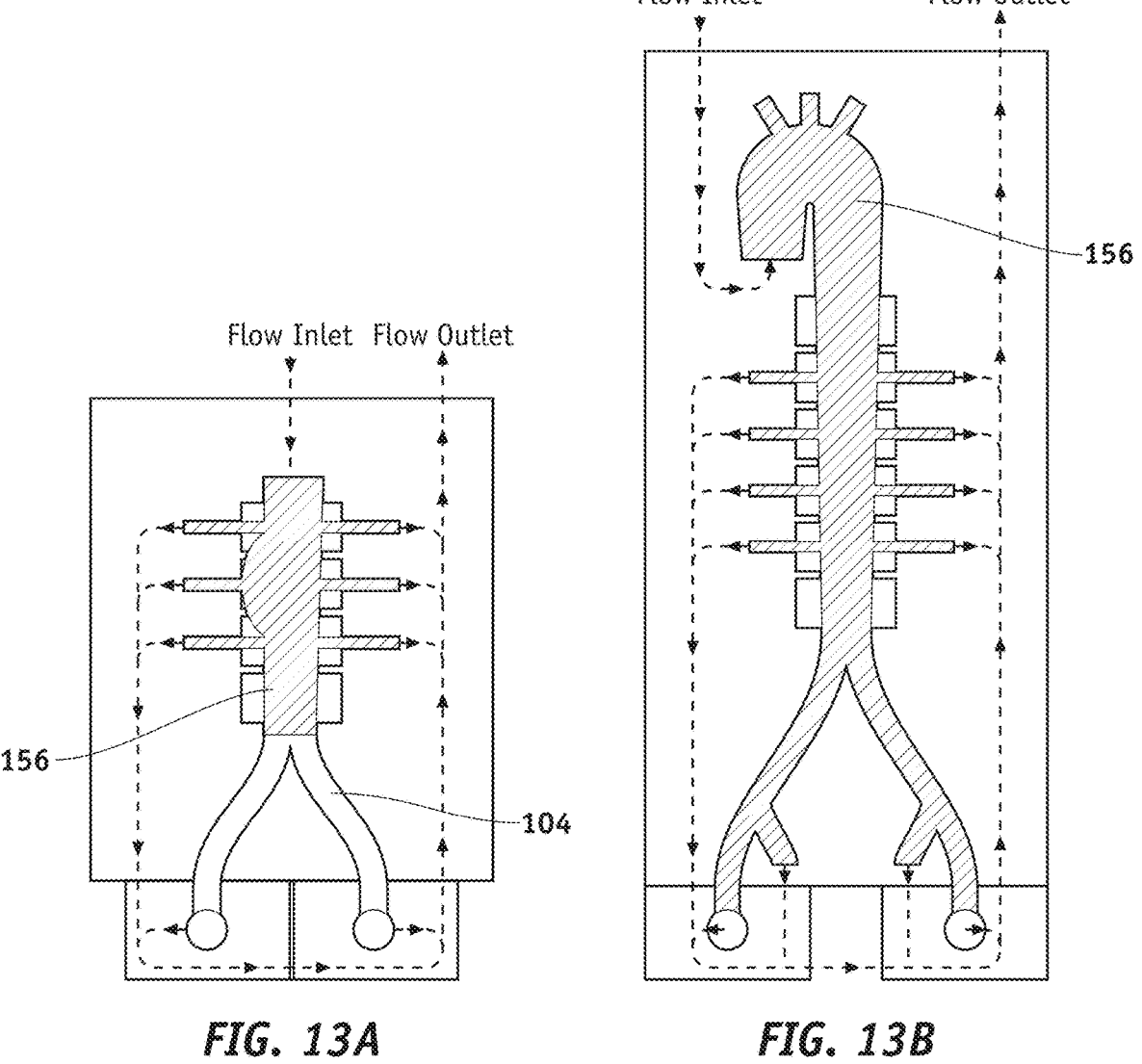
FIGS. 13A-13B show an anatomic cartridge of a portion of an aorta.
Figures 14A, 14B, 14C, 14D, 14E:
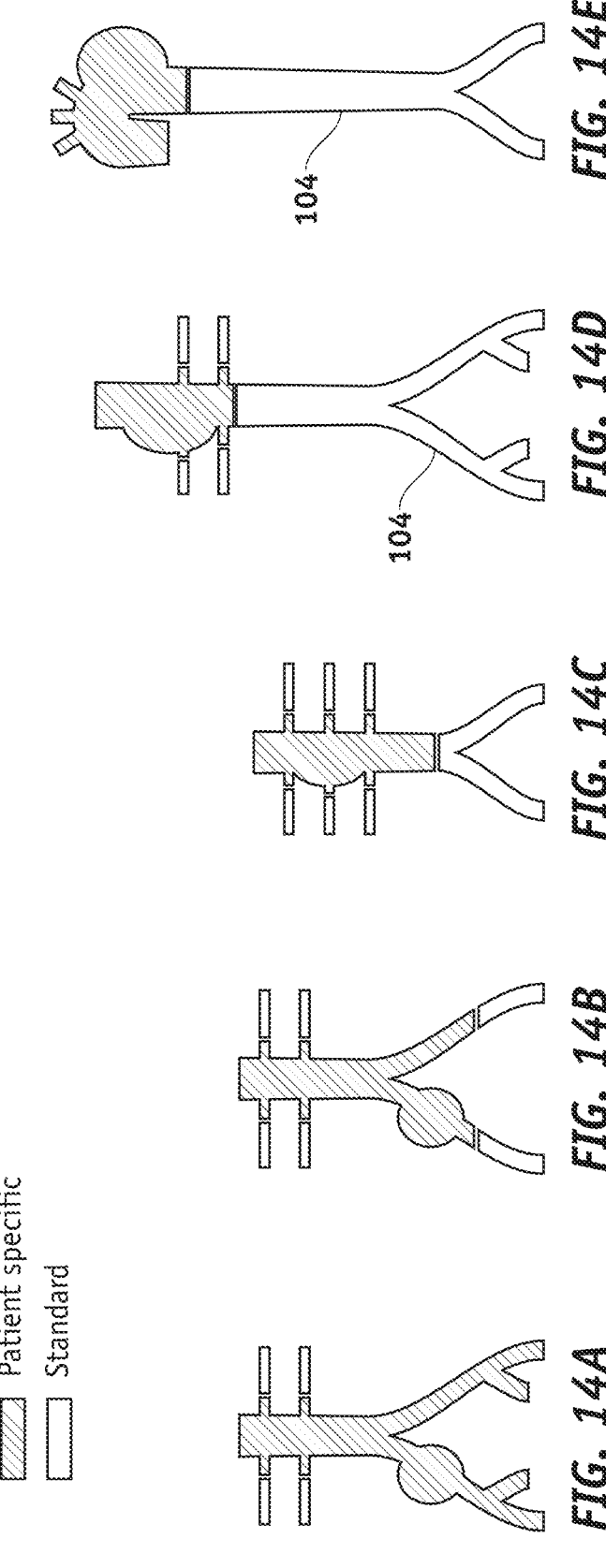
FIGS. 14A-14E show an anatomic cartridge coupled with an optional anatomic access accessory.

FIGS. 13A and 13B depict examples of a human Aorta and Aortic arch which form part of anatomical cartridge 106.

In some examples the anatomy forming part of anatomical cartridge 106 may be 3D printed with patient specific volume, or with a generic volume or combination of patient specific and generic volumes to be assembled with a fluid tight connection.

The anatomy forming part of anatomical cartridge 106 may be 3D printed with materials that provide a realistic haptic feedback to the physician.

The anatomical cartridge 106 may be fluidically coupled with the mat 108 with a fluid inlet 106-I and at least one fluid outlet 106-O at the level of the peripheral arteries along the aorta (including but not limited to renal arteries, splenic artery, mesenteric arteries) and at the level of the hypogastric arteries. The fluid inlet 106-I of the anatomical cartridge 106 is in fluid communication with the outlet port 122 on the housing 102. Fluid exits the housing 102 via outlet port 122 and enters into fluid inlet port 106-I of the anatomical cartridge 106. There are one or more anatomical approaches 106-AA or anatomical access points each provided with a self-sealing membrane 118. The user accesses the anatomical cartridge 106 from one or more of the anatomical approaches 106-AA using guidewires, catheters or other interventional tools.

The anatomy forming part of anatomical cartridge 106 is fluidically coupled (in fluid communication with) with the anatomical approach 106-AA at the level of the iliac arteries.

As shown in FIGS. 13A, 14B-14E the anatomical cartridge 106 may be used in conjunction with an optional anatomical access accessory 104. Use of a generic anatomical access accessory 104 reduces the size and hence the cost of the anatomical cartridge 106.

FIGS. 14A-14E show variations in the anatomy to reflect real-world patients.

Figure 9A:
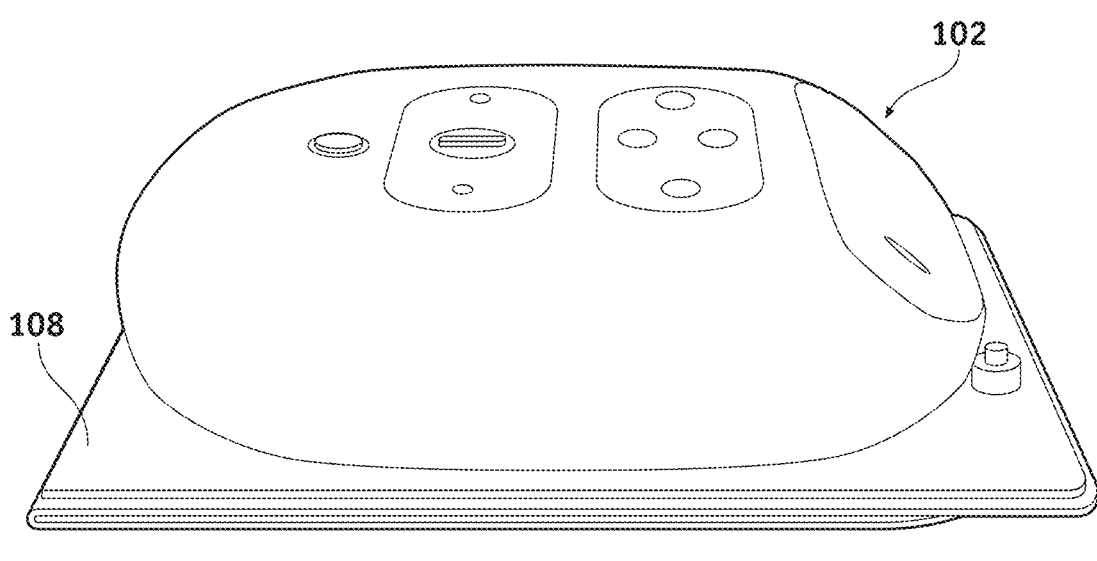
FIGS. 9A-9B show the housing with the mat extended and folded.
Figure 9B:
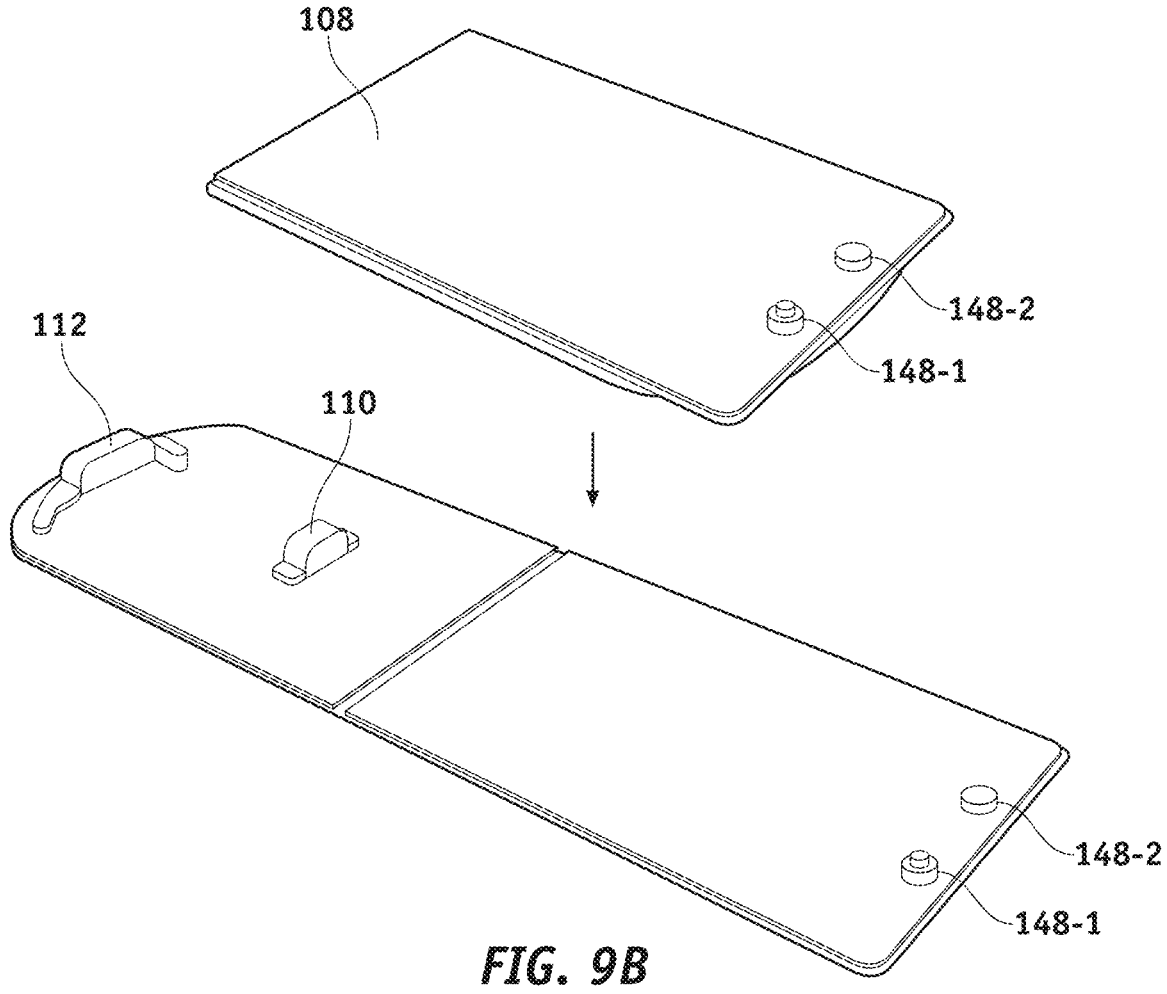

As will be appreciated by one of ordinary skill in the art, there are a number of ways in which the anatomical cartridge 106 may be fluidically coupled with the mat 108. The mat 108 may be coupled to the anatomy using studs 148 such as shown in FIG. 9B. Alternatively, tubing 108-T may be used to connect the housing 102 to the anatomical cartridge 106 using a fluid tight press or interference connection (e.g., bayonet) with or without a valve to interrupt flow of fluid. The tubing 108-T may include screw threads such that the various connections are made by screwing the tubing 108-T onto the various junctions of the housing 102.

The Mat

The mat 108 allows for the positioning of the anatomical cartridge 106.

Cartridge 106 includes plural arteries 106-A which are connected to the fluid outlet 106-O which provides a fluid path back to the tank 103 of the station 102. In some examples, one or more of the arteries 106-A are provided with a valve 106-V. In some examples, the valve 106-V is a normally closed valve which is opened when the artery 106-A is connected to the fluid outlet 106-O. In some examples, the valve 106-V is manually opened/closed. In some cases, one or more of the 106-A arteries may be plugged or capped instead of connecting them to the fluid outlet 106-O. Although not specifically illustrated, a sensor 154 may be connected to one or more of the arteries 106-A. For example, sensor 154 (flow and/or pressure) may be interposed between artery 106-A and the connection to the fluid outlet 106-O.

Figure 10A:
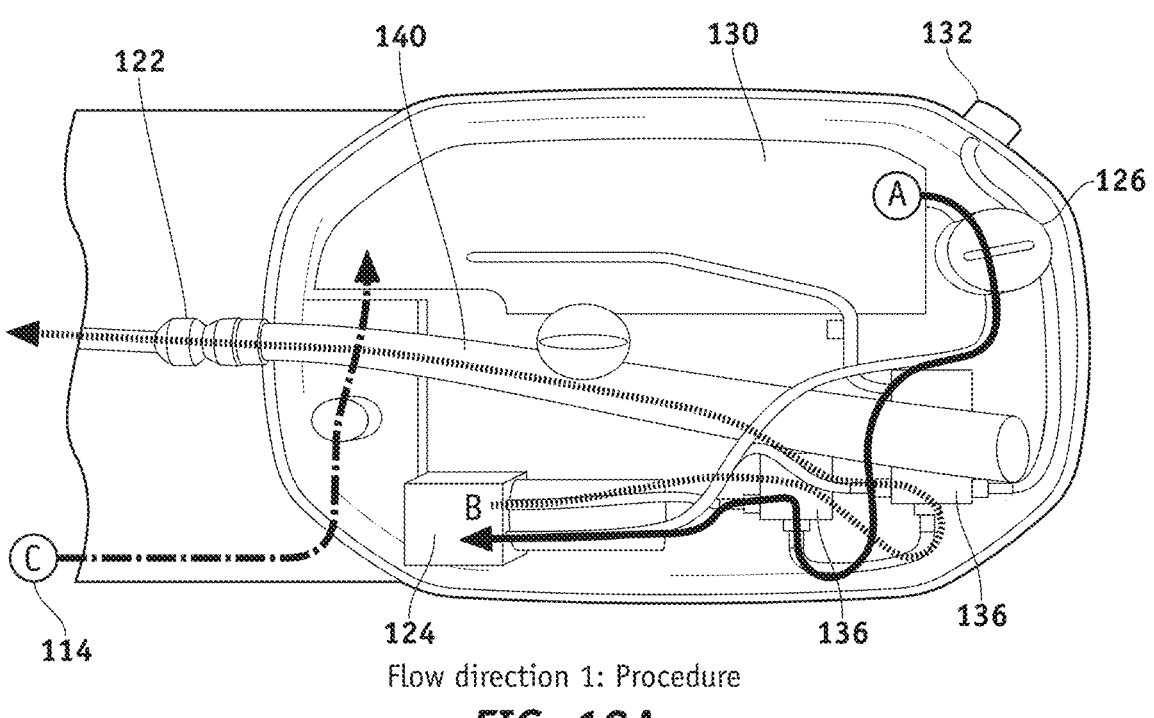
FIGS. 10A-10C show the flow direction in operation and the flow directions when flushing fluid from the housing.
Figure 10B:
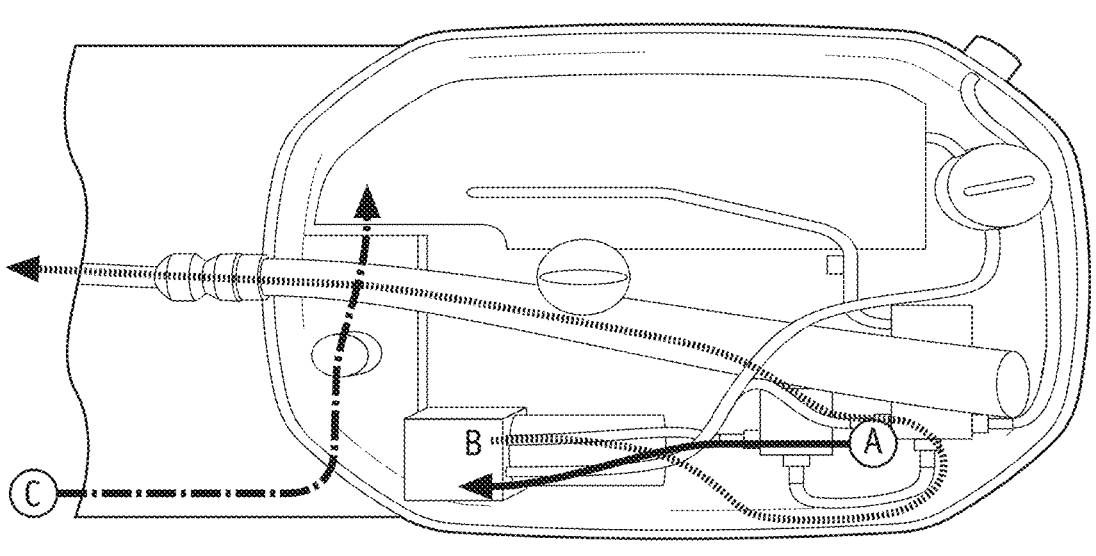
Figure 10C:
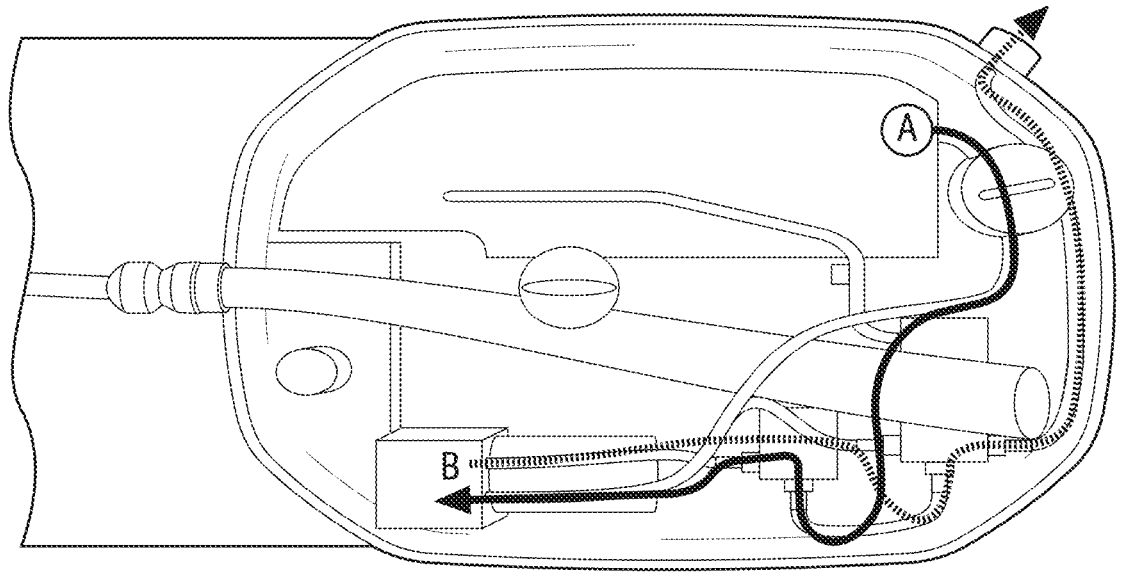

In FIG. 10A there are eight arteries (six arteries 106-A and the two anatomical approaches 106-AA) connected to fluid outlet 106-O and a single fluid inlet 106-I. In FIG. 10B there are twelve arteries (ten arteries 106-A and the two anatomical approaches 106-AA) connected to fluid outlet 106-O and a single fluid inlet 106-I.

The physiological lumens 106-A of the anatomical cartridge 106 may be directly connected to the Mat 108 using studs 148 such as shown in FIG. 9B.

The approach ways 106-AA are connected to the Anatomy at the level of the femoral approach to allow the navigation of endovascular guidewires, catheters and other medical devices commonly used in such procedures through a fluid tight path.

The mat 108 is fluidically coupled with the station 102 and transfers the fluid from the Station 102 to the anatomical cartridge 106 at the level of the aorta.

The mat 108 is fluidically coupled with the station 102 and transfers the fluid from the several lumens of the anatomical cartridge 106 to the station 102.

The fluid path (e.g., tubing or the like) between the station 102 and the anatomical cartridge 106 can be integrated within the mat 108, or may be provided on the upper surface of the mat 108.

Non-connected lumens 108-A of the mat 108 or anatomical cartridge 106-A can be selectively sealed with faucet-like valve or by providing a removable cap or plug.

The Spine:

A mimic spine 156 can be placed under the anatomical cartridge 106 to support the anatomical cartridge 106 and to provide radio-imaging landmarks for the endovascular procedures. The mimic spine 156 is composed of a radiopaque material which will provide a realistic viewing experience mimicking the image quality of a human spine using the imaging modalities commonly used in the catheter lab. The mimic spine 156 is not fluidically connected to the anatomical cartridge 106 but may optionally be connected to the anatomical cartridge 106 simply to maintain a fixed orientation therebetween.

ADDITIONAL FEATURES

Additional anatomical approaches 106-AA may be added to the anatomical cartridge 106 to provide for a radial approach.

The invention claimed is:

1. A surgical training and rehearsal system comprising:
   at least one valve;
   at least one pump fluidically coupled with the at least one valve;
   a tank for storing a fluid, the tank fluidically coupled with the at least one valve;
   a heater adjacent the tank, said heater configured to heat the fluid stored in the tank;
   at least one surgical approach tube having a proximal end sealingly covered by self-healing elastomeric membrane, the surgical approach tube being fluidically coupled with the at least one valve, the tank, and the at least one pump;
   an outflow port fluidically coupled with a distal end of the surgical approach;
   an anatomical cartridge fluidically coupled with the outflow port, the anatomical cartridge comprising at least one tortuous path whose shape, size and mechanical properties mimic those of a portion of a human circulatory system selected from the group consisting of aorta, peripheral arteries along the aorta, and hypogastric arteries;
   a mat;
   a housing removably attached to the mat, the housing enclosing one or more of the at least one valve, the at least one pump, the tank and the heater; and
   a return line fluidically coupling the anatomic cartridge with the housing, the return line at least partially embedded within the mat.

2. The surgical training and rehearsal system of claim 1, wherein the peripheral arteries along the aorta include one or more of renal arteries, splenic artery, or mesenteric arteries.

3. The surgical training and rehearsal system of claim 1, further comprising at least one sensor for measuring at least one of temperature, flow rate, or pressure of the fluid.

4. The surgical training and rehearsal system of claim 1, wherein one of the housing and the mat is equipped with a first stud and the other of the housing and the mat is equipped with a first recess configured to engage with the first stud, wherein the first stud and the first recess fluidically couple the tank to the return line.

5. The surgical training and rehearsal system of claim 4, wherein one of the housing and the mat is equipped with a second stud and the other of the housing and the mat is equipped with a second recess configured to engage with the second stud, wherein the second stud and the second cooperatively prevent the housing from rotating with respect to the mat.

6. The surgical training and rehearsal system of claim 1, wherein the housing, mat, anatomical cartridge, and anatomical access cartridge are formed of materials which are compatible with X-ray, and fluoroscopy.

7. The surgical training and rehearsal system of claim 1, wherein at least one of the anatomical cartridge and the mat contain a first magnet and the other of the anatomical cartridge and the mat contain a material magnetically attracted to the first magnet.

8. The surgical training and rehearsal system of claim 1, wherein an exterior surface of the housing has a surface geometry shaped to replicate a human thigh, whereby the exterior surface of the housing provides a hand-rest for a user.

9. The surgical training and rehearsal system of any of the preceding claims, further comprising a drain port in fluid communication with the at least one valve and the tank, wherein the at least one valve has a flush position in which a fluid path between the tank and the drain port is open.

10. The surgical training and rehearsal system of claim 1, wherein the at least one valve comprises first and second solenoid valves.

11. The surgical training and rehearsal system of claim 1, further comprising a display in communication with and displaying sensor data from at least one sensor.

12. The surgical training and rehearsal system of claim 1, further comprising a wireless communications module in communication with at least one sensor and wirelessly transmitting sensor data to at least one of a display and a server.

13. The surgical training and rehearsal system of claim 1, further comprising:

a first filter fluidically coupled with at least one valve such that fluid passes through the filter before entering at least one valve.

14. The surgical training and rehearsal system of claim 13, further comprising a second filter fluidically coupled with the tank such that fluid passes through the second filter before entering the tank.

* * * * *